(12) United States Patent
Saballus

(10) Patent No.: US 7,077,260 B2
(45) Date of Patent: Jul. 18, 2006

(54) DEVICE FOR CLEANING CORRUGATOR BELTS

(76) Inventor: Gerald Michael Saballus, 111 Acacia Dr., #501, Indian Head Park, IL (US) 60525

( * ) Notice: Subject to any disclaimer, the term of this patent is extended or adjusted under 35 U.S.C. 154(b) by 0 days.

(21) Appl. No.: 10/880,782

(22) Filed: Jun. 29, 2004

(65) Prior Publication Data

US 2005/0284732 A1 Dec. 29, 2005

(51) Int. Cl.
*B65G 45/22* (2006.01)
*B65G 45/24* (2006.01)

(52) U.S. Cl. .................... 198/495; 134/122 R
(58) Field of Classification Search ............... 198/495; 134/122 R
See application file for complete search history.

(56) References Cited

U.S. PATENT DOCUMENTS

| 4,701,242 | A | * | 10/1987 | Scarano et al. | ............. | 162/275 |
| 4,777,972 | A | * | 10/1988 | Adam | ......................... | 134/172 |
| 5,964,960 | A | * | 10/1999 | Boeck | ......................... | 134/34 |
| 6,135,267 | A | * | 10/2000 | Straub | ......................... | 198/495 |
| 6,244,423 | B1 | * | 6/2001 | Tacchi et al. | ................ | 198/495 |
| 6,360,758 | B1 | * | 3/2002 | Eivola et al. | ............ | 134/122 R |
| 2003/0178048 | A1 | * | 9/2003 | Honkala et al. | ......... | 134/104.2 |

FOREIGN PATENT DOCUMENTS

JP          06199410 A  *  7/1994

\* cited by examiner

*Primary Examiner*—Gene O. Crawford
*Assistant Examiner*—Mark A. Deuble

(57) ABSTRACT

A device for cleaning the endless belt of a corrugator machine while the belt is moving and the machine continues in operation. The device includes a movable cleaning head incorporating a sprayer means for applying a forceful stream of cleaning solution to the belt for loosening debris and dissolving contaminants, and a vacuum means for removing the loosened debris and contaminated cleaning solution for recycling or disposal. The movable cleaning head is carried on a supporting track for transverse movement across the full width of the belt from edge to edge. The width of the head is 1/X of the width of the belt, and traverses the entire width of the belt at least once during each X circumferential belt revolutions past the head.

3 Claims, 2 Drawing Sheets

DEVICE FOR CLEANING CORRUGATOR BELTS

FIELD OF THE INVENTION

This invention relates to machines for the manufacture of corrugated paper board in which a layer of corrugated paper material is adhesively attached to at least one sheet of liner material by means of a porous endless belt, called a corrugator belt, which draws and aligns the combined layers into a single bonded sheet. It relates in particular for a device for cleaning the corrugator belt, either periodically or continuously, of its accumulated burden of adhesive particles, dust, and paper debris which could otherwise contaminate the finished board product.

BACKGROUND OF THE INVENTION

Corrugator machines have been long and widely used in the manufacture of laminated corrugated board materials. Such a machine is described in Wicker U.S. Pat. No. 3,368,933 (1968) which shows in detail a corrugator combiner machine which continuously combines an inside corrugated sheet with an upper and a lower flat liner sheet using a liquid adhesive, typically an aqueous solution of sodium silicate or starch. These three sheets, treated with adhesive, are brought together and pressed by one or more endless belts which carry them on to a series of heated plates to be dried. The heat from the plates is conducted directly to the assembled corrugated web to dry it while being held down by the endless belts.

Other designs for corrugated board-making machinery are shown in patents to Lawton U.S. Pat. No. 4,042,446 (1977); Bennett et al., U.S. Pat. No. 4,935,082 (1990); Marschke, U.S. Pat. No. 5,561,918 (1996); Teschner U.S. Pat. No. 5,539,997 (1996); Knorr et al. U.S. Pat. No. 5,632,850 (1997); and Marschke et al. U.S. Pat. No. 6,074,520 (2000). Some of these machines use endless corrugator belts while others do not. The present invention is particularly adapted for use with machines in which an endless corrugator belt is employed.

In addition to their drying function, the endless belts also serve to frictionally engage and transport the web past the heated plates and into a cooling section of the combiner machine. Features which are necessary or desirable for such corrugator belts include qualities of strength, heat resistance, moisture resistance, and being relatively porous so as to permit the transmission and escape of water vapor from the drying corrugated product. Such belts must also be wear-resistant, particularly at their outer edges. They further must be rigid in the cross-machine direction so as not to distort while carrying the finished corrugated product along its intended path.

In response to these needs, several corrugator belts have been developed. Typical examples are described in patents to Romanski et al. U.S. Pat. No. 4,403,632 (1983); Birzele U.S. Pat. No. 5,785,621 (1998); Lanthier U.S. Pat. No. 6,276,420 B1 (2001); and Billings et al. U.S. Pat. No. 6,470,944 B1 (2002).

The process of manufacturing continuous sheets of corrugated board is inherently dusty and dirty. The corrugator belts used on most such machines typically become fouled with a stubborn, deeply ingrained coating of paper lint, adhesive particles, and debris of all kinds. Regular cleaning is therefore required. Because the corrugator web is typically constructed of a porous, moisture-resistant polymer, the cleaning process is typically very much like that used for the cleaning of synthetic carpets in homes and businesses. A heated spray of water-based detergent is forcibly directed at and into the body of the web, sometimes together with mechanical scrubbing or other agitation of the cleaning solution, followed by a vacuum cleaning process to remove as much of the suspended or dissolved debris as possible, leaving the web clean and relatively dry, and ready for re-use. Such a cleaning process requires that the corrugator machine be stopped so that an operator can climb on top of the web (being the paper-contacting surface on its return path) to perform the necessary cleaning operations. The entire machine must be shut down to perform this operation, with a consequent loss of production. Production managers must carefully coordinate their operations to permit these periodic cleanings without interrupting the operation of the entire line and temporarily idling the entire operating staff. When an unforeseen condition requires an unscheduled cleaning, production planning and staffing schedules can be seriously disrupted. Further, there are physical dangers for the cleaning operator, who at present is required to climb atop the web and walk upon it while applying the cleaning solution, agitating it to loosen and remove dirt and debris, and vacuuming up the residue.

The cleaning of endless belts of various kinds has been the subject of certain prior art patents, but the solutions there described have little applicability to solving the problems presented by the in-place cleaning of a corrugator web belt, particularly while the corrugator machine is in continuous operation. For instance, Schaefer et al. U.S. Pat. No. 6,601,692 B2 (2003) discloses a moving brush in the form of an endless loop carried by a track aligned transversely to a moving bulk material conveyor belt. The brush cleans the belt of any adhering remaining material which might cause damage to the belt as it continues along its recirculating path.

Bright U.S. Pat. No. 4,365,706 (1982) discloses another conveyor belt cleaning device in which a fixed scraper member is positioned transversely across the belt to physically scrape off any adhering material. The scraper is resiliently urged against the face of the belt, but has no provision for applying a cleaning solution or vacuuming up the residue. Similar belt cleaning devices are disclosed by Rappen U.S. Pat. No. 5,114,000 (1992) and Tenzer U.S. Pat. No. 6,349,816 B1 (2002).

Franzoni et al. U.S. Pat. No. 6,533,102 B2 (2003) discloses a conveyor belt cleaner in which one or more cleaning rollers cooperate to form a solvent-retaining receptacle, which serve to clean the belt by rotating in a direction opposite to the direction of belt movement. No physical scrubbing action or vacuum removal of residue is disclosed or suggested. Chupin et al. U.S. Pat. No. 4,918,778 (1990) discloses a similar solvent-dipping device in which the belt is directed into a solvent dip tank with a spray arrangement coupled with a squeezer roller, with the belt being dipped a second time before returning to its normal path. No mechanical agitation or vacuum removal of residual solvent is shown or suggested, making it impractical for use with a corrugator machine.

Straub U.S. Pat. No. 6,135,267 (2000) discloses a spray device for cleaning a continuous transport screen or belt as used in the manufacture of paper, felt and the like. One or more fixed spray units are positioned to discharge a spray of cleaning fluid onto the opening (exit side) nip of a drive roller, while a surrounding suction chamber draws the contaminated cleaning fluid back for recycling or disposal. However, the spray nozzles are fixed and no mention is made of using a forceful stream for dislodging and removing any adhering particles or debris. The device is intended for use with a relatively porous belt and relies on the cleaning agent penetrating to the other side of the belt, such that both sides are cleaned simultaneously. The suction chamber of the device must therefore be positioned at the nip of the roller to strengthen the effect of the vacuum as it exits the nip (col. 2, lines 16–18). Another machine for a like purpose is disclosed by Kotitschke U.S. Pat. No. 5,517,714 (1996) in which a continuous spray is directed onto and through the web, with the residue being collected in a trough on the other side. Neither these nor any of the other prior art patents described herein could find practical application in a corrugator machine for cleaning a continuously moving corrugator belt.

OBJECTS OF THE PRESENT INVENTION

It is therefore a principal object of the invention to provide a device capable of cleaning a moving corrugator belt, either periodically or continuously, without requiring the operation of the corrugator machine to be interrupted.

A related object is to provide such a device which is capable of at least a three-step cleaning process, the steps being (1) forcefully applying a jet, spray or stream of cleaning solution to the contaminated surface of the belt, (2) allowing the cleaning solution to loosen any contaminants and debris, and (3) vacuuming away the contaminated solution and cleaning residue to be recycled or disposed of, leaving the belt clean and relatively dry as it proceeds toward the next step in the corrugating machine's manufacturing process.

A further object is to provide such a device which can be actuated automatically, either at predetermined intervals or selectively when it is determined, either by optical detection means or by the observation of a skilled operator, that the belt is in need of cleaning.

A more detailed object is to provide such a device in which the principal cleaning elements consist of a spray means, a scrubber means and a vacuum de-watering means combined into a single movable cleaning head, with the cleaning head being movably carried by traversing means for traversing and cleaning the full width of the belt, from one edge to the other, in a manner which assures the substantially complete cleaning of the entire belt surface.

SUMMARY OF THE INVENTION

The present invention is characterized by a cleaning head comprising a forceful spray means and a vacuum means for picking up the spent cleaning fluid and loosened debris. Preferably, the cleaning head covers only a portion of the belt's width, and is translated back and forth across the full width of the belt, from one edge to the other, in a manner which assures substantially complete cleaning of the entire belt surface as it repeatedly passes under the cleaning head. The spray means is supplied with cleaning solution from a fluid reservoir, and the contaminated cleaning solution picked up by the vacuum means is either cleaned and recycled back to the fluid reservoir or otherwise disposed of. The cleaning head is carried on a supporting track for movement substantially transverse to the moving belt.

BRIEF DESCRIPTION OF THE DRAWINGS

The preferred embodiment is herein described in detail with references to the drawings, wherein.

DETAILED DESCRIPTION OF THE INVENTION

Figure 1:
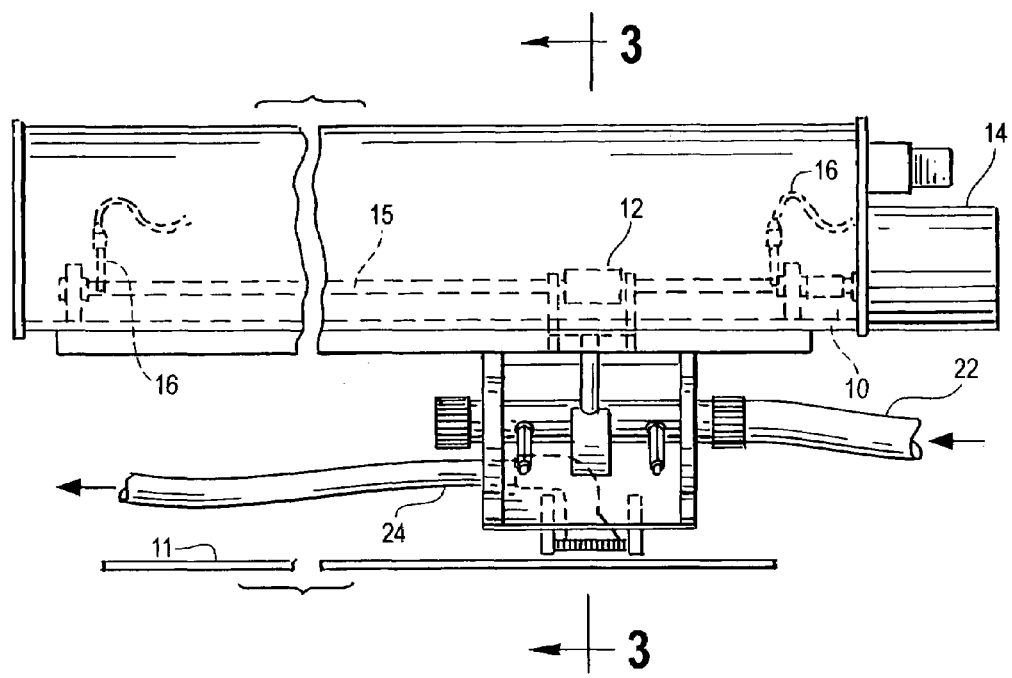
FIG. 1 is a side elevation of the belt cleaning device of the present invention, positioned over a moving belt traveling away from the viewer.

Referring to FIG. 1, there is shown a transverse support rail 10 overlying a corrugator belt 11 which, in the illustration, is moving toward the observer. The belt 11 is incorporated in a corrugator machine (not shown) similar to that shown in Wicker U.S. Pat. No. 3,368,933 (1968), and comprises an endless loop which passes continuously beneath the support rail 10 during normal machine operation.

Figure 2:
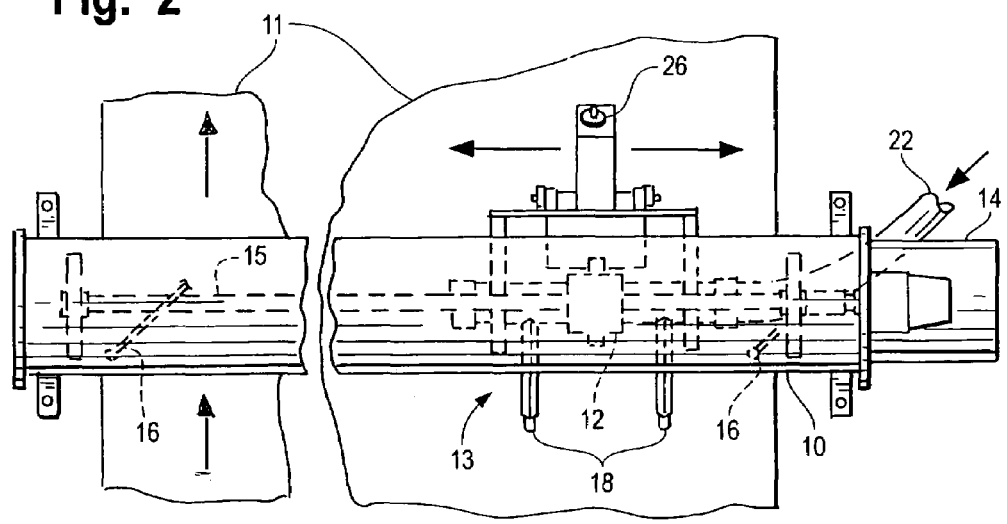
FIG. 2 is a plan view of the device of FIG. 1.
Figure 3:
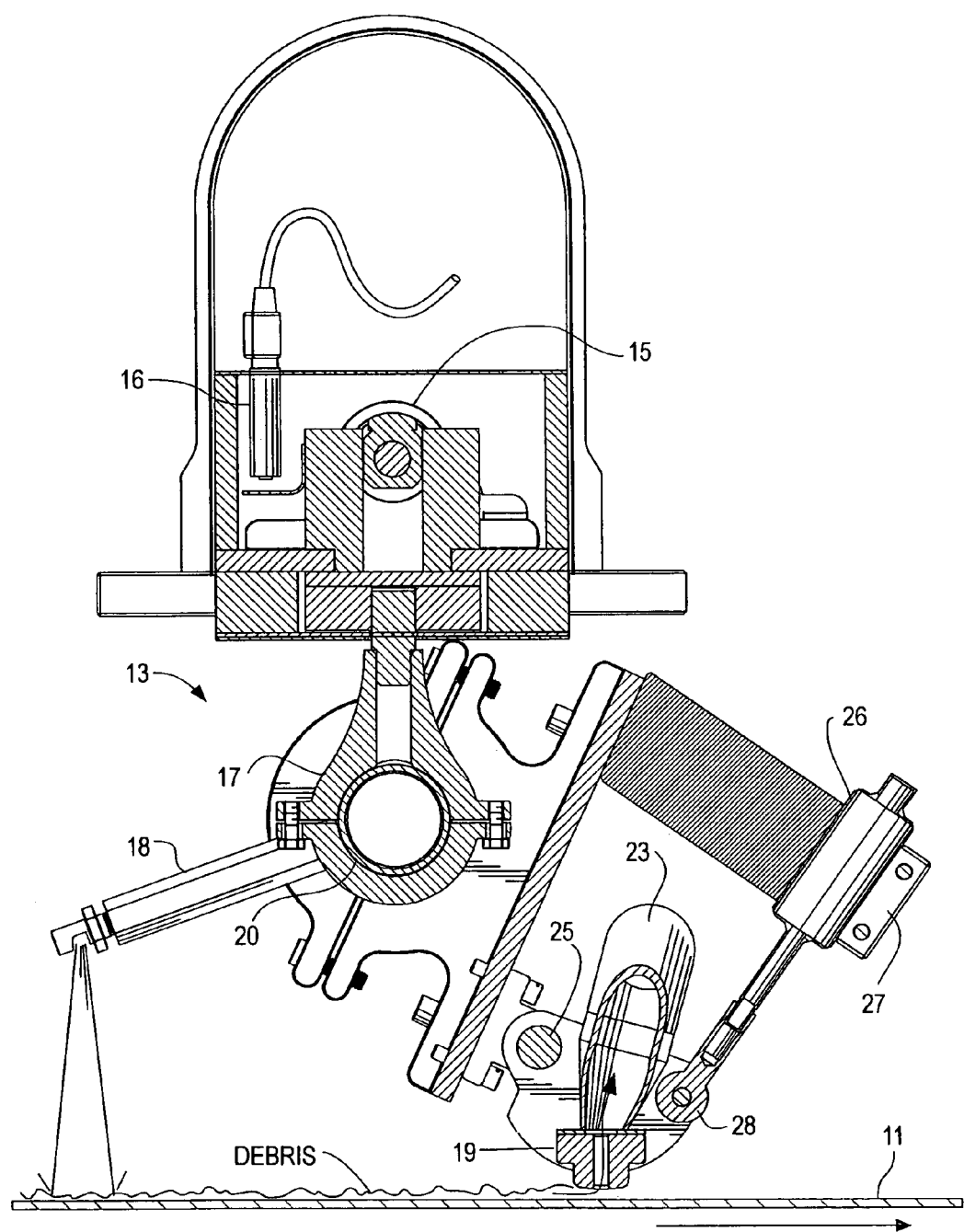
FIG. 3 is an enlarged end elevation of the mechanism of the previous figures, with the belt moving from right to left, and showing the details of the operating mechanism of the cleaning head.

In the preferred embodiment, a sliding carriage 12 is carried by the rail 10 for transverse back-and-forth reciprocating motion, being driven by a motor 14 driving a worm drive 15 engaging the carriage 12, although any suitable mechanism for providing transverse motion such as a linear motor, lead/ball screw nut assembly, or the like. From the carriage 12 is suspended a moveable cleaning head 13 (FIGS. 2 and 3) having means for both applying a forceful spray of cleaning solution onto the moving belt and then picking up the spent solution and loosened debris as the belt continues on its path beneath the cleaning head.

The moveable cleaning head 13 is suspended from and the moving carriage 12 with an adjustable clamp 17 which permits the head to be angularly adjusted relative to the moving belt 11 to provide the optimum cleaning effect. The construction of the cleaning head 13 (FIG. 3) is an important feature of the invention. The cleaning head 13 comprises two functional elements, one or more spray nozzles 18, and a vacuum pick-up head 19. In the present embodiment, two parallel spray nozzles are used.

The spray nozzles 18 are attached to a fluid manifold 20 which is itself connected to the cleaning head 13 with adjustable clamps which permit the vertical position and spray angle of the nozzles to be adjusted relative to the moving belt 11. The fluid manifold 20 is provided with pressurized cleaning spray by a fluid supply hose 22, which is in turn supplied with pressurized fluid from a pump or pressurized supply tank (not shown). The preferred cleaning fluid is a conventional detergent solution which can be heated if desired for enhanced cleaning effect.

As the endless belt 11 passes beneath the cleaning head 13, it first encounters the spray from the nozzles 18, each of which directs an intense direct spray of pressurized cleaning fluid at the belt's surface, loosening any dirt or debris, and dissolving any starch or other adhesive which may have adhered to the belt in the course of making corrugated board. Then the belt, carrying its now-loosened burden of spent fluid and debris, passes beneath the vacuum head 19. The vacuum head 19 is attached by a vacuum manifold 23 to a vacuum line 24 leading to a source of vacuum (not shown) incorporating a fluid separator (also not shown) for the purpose of separating out the spent fluid and removed debris for recycling or disposal, as appropriate.

According to another feature of the invention, the vacuum head 19 is resiliently mounted on a hinge mount or pivot 25 for rotational movement in an upward and rearward (with respect to belt movement) direction for the purpose of maintaining a predetermined pressure against the moving belt, while still permitting the vacuum head 19 to avoid damage by moving resiliently away from the belt in the event that it encounters a chunk of undissolved and unremoved debris. This is accomplished by providing a pair of pre-pressurized air cylinders 26 held to the cleaning head 13 by cylinder clamps 27 and connected by ball joints (spherical connectors) 28 to the vacuum head 19.

In operation, the carriage 12 and suspended cleaning head 13 are translated slowly back and forth across the length of the support rail 10 in a reciprocal motion as the belt 11 passes beneath. According to a feature of the invention, the rate of movement of the cleaning head 12 is matched to the circumferential speed of the belt 11 such that the entire surface of the belt is covered and cleaned each time the cleaning head moves from one side of the support rail 10 to the other. If the width of the cleaning head (transverse to the direction of belt movement) is considered to be 1/X of the belt width, where X is a number greater than one, then the movement if the cleaning head is controlled and matched to the speed of the belt such that the head makes one full pass over the belt (from one side to the other) each X circumferential revolutions of the belt. This aspect of the invention assures that the entire surface of the belt is covered each time the cleaning head 13 passes from one side to the other.

As the cleaning head 13 reaches the limit of its linear movement at the edge of the belt 11, its presence is detected by a limit detector means 16 which may be, for example, an optical sensor or physical limit switch or other suitable means for effecting a change of direction. At that point the rotation of the motor 14 is reversed by a controller means (not shown) and the cleaning head is returned to its starting point, again covering the entire belt as it makes another X circumferential revolutions. Alternatively, the cleaning head 13 may simply be rapidly translated to the opposite side of the rail 11, and the process started over again in the same manner. In either case, after a predetermined number of circumferential revolutions past the cleaning head 13, the entire surface of the belt will have been covered and cleaned.

I claim:

1. A device for cleaning an endless porous moving belt, said device being characterized by a movable cleaning head comprising
   a) spray means for applying a forceful stream of cleaning solution to a portion of said moving belt,
   b) a vacuum head immediately following said spray means including vacuum means for applying a suction force to remove spent cleaning solution and loosened and dissolved contaminants from said porous belt, said vacuum head being supported independently from said spray means by a hinge mount and a pressurized pneumatic cylinder resiliently opposing movement of said vacuum head about said hinge mount and away from said moving belt surface, thereby holding the vacuum head in predetermined proximity to the moving belt surface while permitting controlled resilient movement away from said surface in response to passing debris,
   c) traversing means for moving said cleaning head across the full width of said porous belt in a predetermined pattern whereby after a predetermined number of passes past said cleaning head the entire moving belt surface will be effectively covered and cleaned, said traversing means including a supporting track for guiding said movable cleaning head along a path substantially transverse to the direction of movement of said moving belt, and
   d) operating means including an electric motor driving a worm gear substantially parallel to said supporting track for driving said moveable cleaning head along said substantially transverse path, said operating means having limit sensing means for detecting the approach of said movable cleaning head and causing it to reverse direction and to return along said supporting track in an opposite direction.

2. The device as claimed in claim 1, in which said moveable cleaning head has a width equal to 1/X of the width of the belt, where X=a number greater than one, and said traversing means is effective to cause said moveable cleaning head to traverse the width of said belt at least once during X full circumferential revolutions of said belt past said cleaning head.

3. The device as claimed in claim 1 or 2, inclusive, including recycling means for cleaning said spent cleaning solution and directing it back to said spray means for re-use.

* * * * *